US011477188B2

(12) United States Patent
Duchastel

(10) Patent No.: US 11,477,188 B2
(45) Date of Patent: Oct. 18, 2022

(54) INJECTION OF TOKENS OR CLIENT CERTIFICATES FOR MANAGED APPLICATION COMMUNICATION

(71) Applicant: Citrix Systems, Inc., Fort Lauderdale, FL (US)

(72) Inventor: Thierry Duchastel, Cooper City, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 182 days.

(21) Appl. No.: 16/918,022

(22) Filed: Jul. 1, 2020

(65) Prior Publication Data

US 2022/0006800 A1 Jan. 6, 2022

(51) Int. Cl.
*H04L 29/06* (2006.01)
*H04L 9/40* (2022.01)
*H04L 9/32* (2006.01)

(52) U.S. Cl.
CPC .......... *H04L 63/083* (2013.01); *H04L 9/3236* (2013.01); *H04L 9/3268* (2013.01); *H04L 63/0815* (2013.01); *H04L 63/0823* (2013.01); *H04L 2463/082* (2013.01)

(58) Field of Classification Search
CPC ............... H04L 63/083; H04L 63/0823; H04L 63/0807; H04L 2463/082; H04L 9/3236; H04L 9/3268
See application file for complete search history.

(56) References Cited

U.S. PATENT DOCUMENTS 8,868,756 B1 10/2014 Young et al.
9,787,477 B1 * 10/2017 Singal .................. H04L 9/3265
10,397,278 B2 8/2019 Gummaraju et al.
(Continued)

FOREIGN PATENT DOCUMENTS

WO 2014197248 A1 12/2014

OTHER PUBLICATIONS

Brice Augustin et al., Measuring Load-balanced Paths in the Internet, Oct. 2007, ACM, pp. 149-160. (Year: 2007).*
(Continued)

*Primary Examiner* — Jeffrey C Pwu
*Assistant Examiner* — Fahimeh Mohammadi
(74) *Attorney, Agent, or Firm* — Banner & Witcoff, Ltd.

(57) ABSTRACT

Methods and systems for injection of tokens or certificates for managed application communication are described. A computing device may intercept a request from an application executable on the computing device, the request being to access a remote resource. The computing device may modify future network communications between the computing device and the remote resource to include a token or a client certificate, where the token or the client certificate is an identifier that enables the future network communications to be routed to the remote resource for a given computing session without use of data from the remote resource or data indicative of a connection of the remote resource in which to receive the future network communications. The computing device may send the future network communications to the remote resource to enable action to be taken on behalf of the computing device in response to receipt of the future network communications.

19 Claims, 7 Drawing Sheets

(56) References Cited

U.S. PATENT DOCUMENTS

| | | | | |
|---|---|---|---|---|
| 11,063,930 | B1* | 7/2021 | Bose | H04L 63/0428 |
| 11,095,638 | B2* | 8/2021 | Rossi | H04L 9/3228 |
| 11,263,036 | B2* | 3/2022 | Shrey | G06F 9/5005 |
| 11,323,274 | B1* | 5/2022 | Bowen | H04L 9/0897 |
| 2010/0138485 | A1* | 6/2010 | Chow | H04L 67/568 |
| | | | | 711/E12.017 |
| 2010/0138907 | A1* | 6/2010 | Grajek | H04L 63/0823 |
| | | | | 709/217 |
| 2010/0275012 | A1* | 10/2010 | Kido | H04L 63/0823 |
| | | | | 380/44 |
| 2014/0007215 | A1* | 1/2014 | Romano | H04W 12/08 |
| | | | | 726/12 |
| 2017/0373860 | A1 | 12/2017 | Kshirsagar et al. | |
| 2018/0034858 | A1* | 2/2018 | Gummaraju | H04L 63/08 |
| 2018/0077144 | A1* | 3/2018 | Gangawane | H04L 63/102 |
| 2019/0074982 | A1* | 3/2019 | Hughes | H04L 9/0863 |
| 2019/0199723 | A1* | 6/2019 | Tak | H04L 63/0807 |
| 2020/0099675 | A1* | 3/2020 | Mardiks Rappaport | |
| | | | | H04L 67/146 |
| 2020/0204381 | A1* | 6/2020 | Meyer | H04W 12/0431 |
| 2021/0075853 | A1* | 3/2021 | Banerjee | H04L 43/0882 |
| 2021/0099449 | A1* | 4/2021 | Frederick | H04L 63/0807 |
| 2021/0152372 | A1* | 5/2021 | Hunt | H04L 9/3297 |
| 2021/0336787 | A1* | 10/2021 | Patel | H04L 9/0643 |
| 2021/0392136 | A1* | 12/2021 | Modi | H04L 9/3234 |

OTHER PUBLICATIONS

Josh Aas et al, Let's Encrypt: An Automated Certificate Authority to Encrypt the Entire Web, Nov. 2019, ACM, pp. 2473-2487. (Year: 2019).*

Kiyoshi Maruyama et al., Dynamic Route Selection Algorithms for Session Based Communication Networks, Oct. 1983, ACM, pp. 162-169. (Year: 1983).*

Qijun Gu et al., Defending against Packet Injection Attacks in Unreliable Ad Hoc Networks, Jan. 23, 2006, IEEE, pp. 1837-1841. (Year: 2006).*

"Mobile application management" Wikipedia https://en.wikipedia.org/wiki/Mobile_application_management website visited Jun. 23, 2020, pp. 1-3.

David Bisson "What Is an SSL/TLS X.509 Certificate" Venafi https://www.venafi.com/blog/what-ssltls-x509-certificate Jan. 15, 2019, pp. 1-6.

R. Housley "Internet X.509 Public Key Infrastructure Certificate and Certificate Revocation List (CRL) Profile" Network Working Group https://www.ietf.org/rfc/rfc3280.txt, Apr. 2002, pp. 1-121.

"An overview of the SSL of TLS handshake" IBM https://www.ibm.com/support/knowledgecenter/SSFKSJ_8.0.0/com.ibm.mq.sec.doc/q009930_.htm website visited Jun. 23, 2020, pp. 1-3.

"What is an opaque token?" stackoverflow https://stackoverflow.com/questions/59158410/what-is-an-opaque-token#:-18 :text=Opaque%20tokens%3A%20Tokens%20in%20a,server%20that%20issued%20the%20token. website visited Jun. 30, 2020, pp. 1-4.

Oct. 1, 2021—(WO) International Search Report and Written Opinion—App No. PCT/US2021/039648.

* cited by examiner

INJECTION OF TOKENS OR CLIENT CERTIFICATES FOR MANAGED APPLICATION COMMUNICATION

FIELD

Aspects described herein generally relate to computer networking, enterprise mobility management, and hardware and software related thereto. More specifically, one or more aspects describe herein provide systems and methods for automated injection of tokens or client certificates in managed application communications.

BACKGROUND

Many organizations and individuals rely on managed applications to perform various tasks. For example, these managed applications may be line-of-business applications, email applications, web browsers, or the like, which may be used by employees of an enterprise organization, and are controlled on an application basis by the enterprise organization using e.g., mobile application management (MAM), or the like. In some instances, these managed applications may be internally developed applications by the enterprise organization and/or commercially available applications by third party organizations.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

There may be technical challenges associated communications between managed applications and third party services. For example, it may be difficult to maintain session stickiness (e.g., routing all requests from a client device to the same backend server) while load balancing. More specifically, load balancers may direct requests to various backend servers based on current processing loads, so as to maximize processing efficiency, which may result in requests being routed to different servers for processing rather than maintaining stickiness. Another technical challenge relates to providing a fluid user experience related to single sign-on or multi-factor authentication. For example, it may be cumbersome and/or time consuming for individuals to perform authentication for a service using more than one credential or device, especially when the individual has already been authenticated within a managed application. As yet another technical challenge, it may be important to perform application tracking to identify a location and/or other endpoint information for a user, but this may be difficult in the context of managed applications, where information related to location, endpoints, or the like might not be shared in communications between the managed application and a third party. It may be important to improve managed application communication between servers and client devices so as to enable session stickiness, efficient authentication, information sharing, or the like between the servers and client devices.

To overcome the limitations described above, and to overcome other limitations that will be apparent upon reading and understanding the present specification, aspects described herein are directed towards injection of tokens or client certificates for managed application communication. More specifically, a computing device including at least one processor, a communication interface, and memory, may use a mobile application management (MAM) framework to intercept a request an application executable on the computing device, the request being to access a remote resource. The computing device may modify future network communications (e.g., to some or all services) between the computing device and the remote resource to include either the token or the client certificate, where the token or the client certificate is an identifier that enables the future network communications to be routed to the remote resource for a given computing session without use of data from the remote resource of data indicative of a connection of the remote resource in which to receive the future network communications.

The computing device may send the future network communications to the remote resource to enable action to be taken on behalf of the computing device in response to receipt of the future network communications.

In one or more instances, a server, corresponding to a first enterprise organization and configured to affect behavior of the application, may be configured to generate the token based on an enrollment communication between the computing device and the server. In these instances, the token may be a set of randomly generated bits mapped in a mapping table by the server to an identity of the computing device or a hash of the identity of the computing device. The computing device may be unable to parse (or understand) the token. In these instances, the MAM server may be unable to decrypt the token, but may be configured to look up the identity of the computing device in the mapping table.

In one or more instances, the token may include one or more of: a user identifier, an identifier of the computing device, time information, or endpoint information. In one or more instances, the computing device may modify the future network communications to include the token by modifying the future network communications to include the token as an additional HTTP header.

In one or more instances, the token may enable one or more of: single sign-on authentication or multi-factor authentication between the computing device and the remote resource. In one or more instances, the token may enable the particular third party server to identify one or more of: a physical location or other endpoint information of the computing device.

In one or more instances, the computing device may send a request to the server requesting a list of server endpoints for which communication should be modified. In one or more instances, the computing device may receive, from the server, the list of server endpoints for which communication should be modified, where the list of server endpoints for which communication should be modified includes the remote resource.

In one or more instances, the remote resource may be affiliated with a second enterprise organization, different than the first enterprise organization. In one or more instances, in response to launching the managed application, the computing device may use a local framework to request, from the server, the token or the client certificate, where the local framework is deployed by the server and used to affect the behavior of the application. The computing device may receive the token or the client certificate from the server.

In one or more instances, the data may be a cookie and the connection may be one or more of an internet protocol (IP) address for the remote resource or a secret sockets layer (SSL) session identifier for the remote resource. In one or more instances, the future network communications may be directed to the remote resource via a load balancer, which may route the future network communications to the remote resource based on the token. In one or more instances, the client certificate may include one or more of: a user identifier or a device identifier. In these instances, the client certificate may be generated by the server based on an enrollment communication between the computing device and the server.

In one or more instances, the server may be configured with a root certificate, (e.g., acting as a Certificate Authority), which may enable the server to generate the client certificate. The remote resource may be configured with a public key for the root certificate that enables the remote resource to validate the client certificate. In one or more instances, the computing device may modify the future network communications to include the client certificate during a TLS handshake between the computing device and the remote resource.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
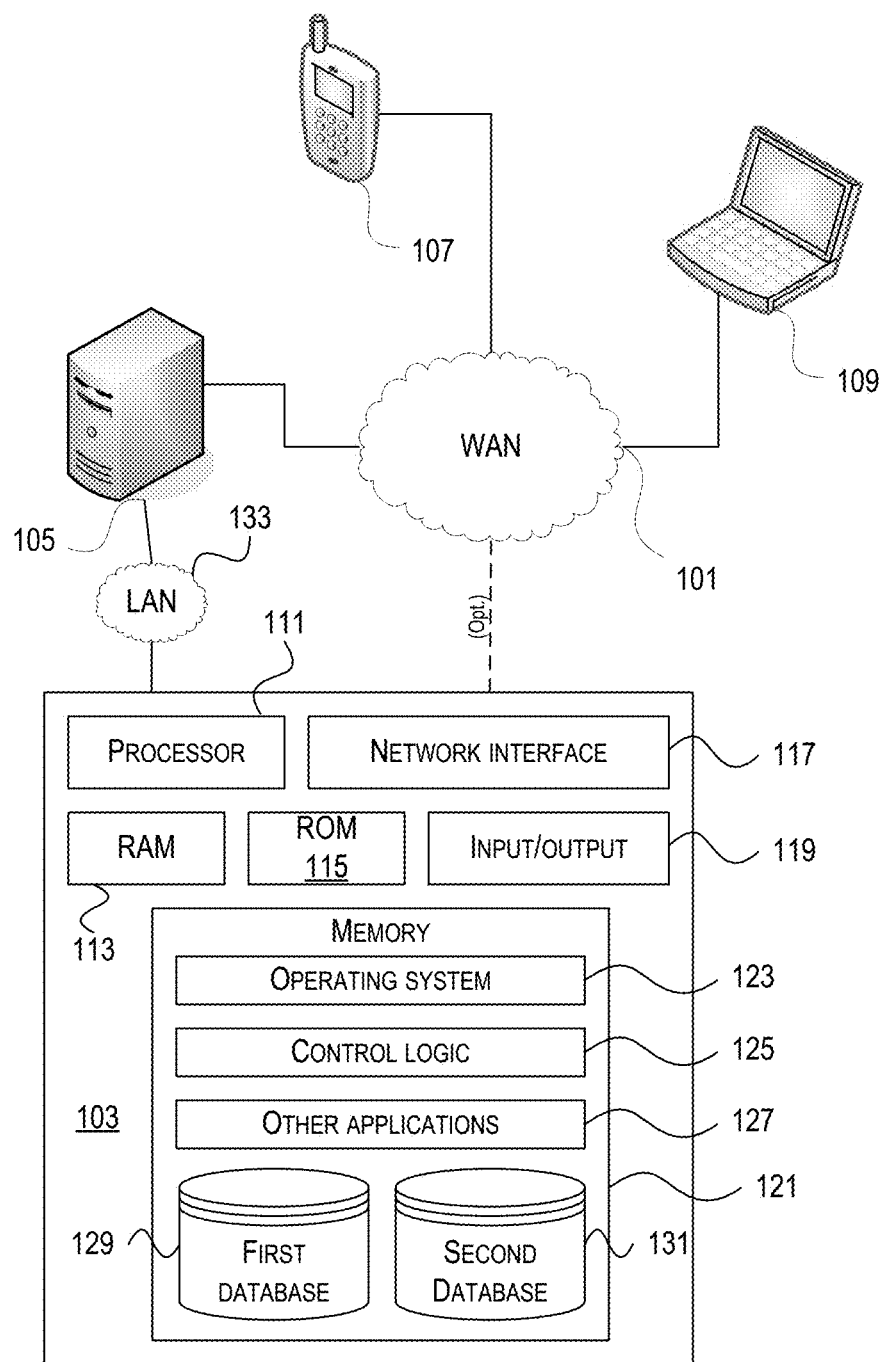
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards injection (e.g., automated injection) of tokens or client certificates in managed application communications. For example, a mechanism may be used to inject a generated token into a communication between managed applications and a service endpoint (e.g., a backend server that may be queried to provide a response, grant access to a service, or the like). For example, A managed application is an application controlled by a software solution that allows an enterprise or other managing entity to affect the behavior of the deployed app. Common examples of this are Mobile (or Modern) Application Management solutions, also known as MAM, and typically used by enterprises to ensure data loss prevention and similar other policies. For example, these managed applications may be line-of-business applications, email applications, web browsers, or the like, which may be used by employees of an enterprise organization, and are controlled on an application basis by the enterprise organization using e.g., mobile application management (MAM), or the like. In some instances, these managed applications may be internally developed applications by the enterprise organization and/or commercially available applications by third party organizations. The nature of controlling these managed apps typically depends on a MAM framework, located on the computing device, which is either injected into the managed app, wraps the managed app, or the app has to call the MAM framework.

In some examples, a mobile application management (MAM) framework may be used to identify a user, a device, or the like, and may be used to change the behavior of outbound network communication from a managed application. In this example, the token may be used for a variety of different purposes, including improving the single sign-on experience for managed applications (e.g., used to provide authentication credentials), adding an additional factor in multi-factor authentication for managed applications (e.g., use the token to store authentication credentials), adding tracking of users, devices, locations, or the like from managed applications to enterprise servers (e.g., use the token to provide location or endpoint information), improving load balancing from managed applications to enterprise servers (e.g., use the token to maintain session stickiness), or the like.

Additionally or alternatively, the communication between a managed application and a service endpoint may be upgraded (e.g., automatically) with TLS client certificate authentication. In this example, the TLS client certification (e.g., an X.509 certificate, or the like) may be enhanced with additional extended key uses such that the same certificate may be used to hold additional information. For example, the TLS client certificate may be extended with additional properties (e.g., service endpoint, device location, other endpoint information, and/or any other information known about the registered device and/or user), which may, in some instances, be encrypted prior to incorporation of these additional properties to TLS client certificate. In some instances, the client certificate may be self-signed (which may e.g., facilitate the generation of the client certificate without the need for a certificate authority). The client certificate may be used for a variety of different purposes, including adding tracking for users, devices, locations, or the like from managed applications to enterprise servers, improving load balancing between managed applications and enterprise servers, which will be explained in more detail below.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected,"

"coupled," and similar terms, is meant to include both direct and indirect connecting and coupling.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Enterprise Mobility Management Architecture

Figure 2:
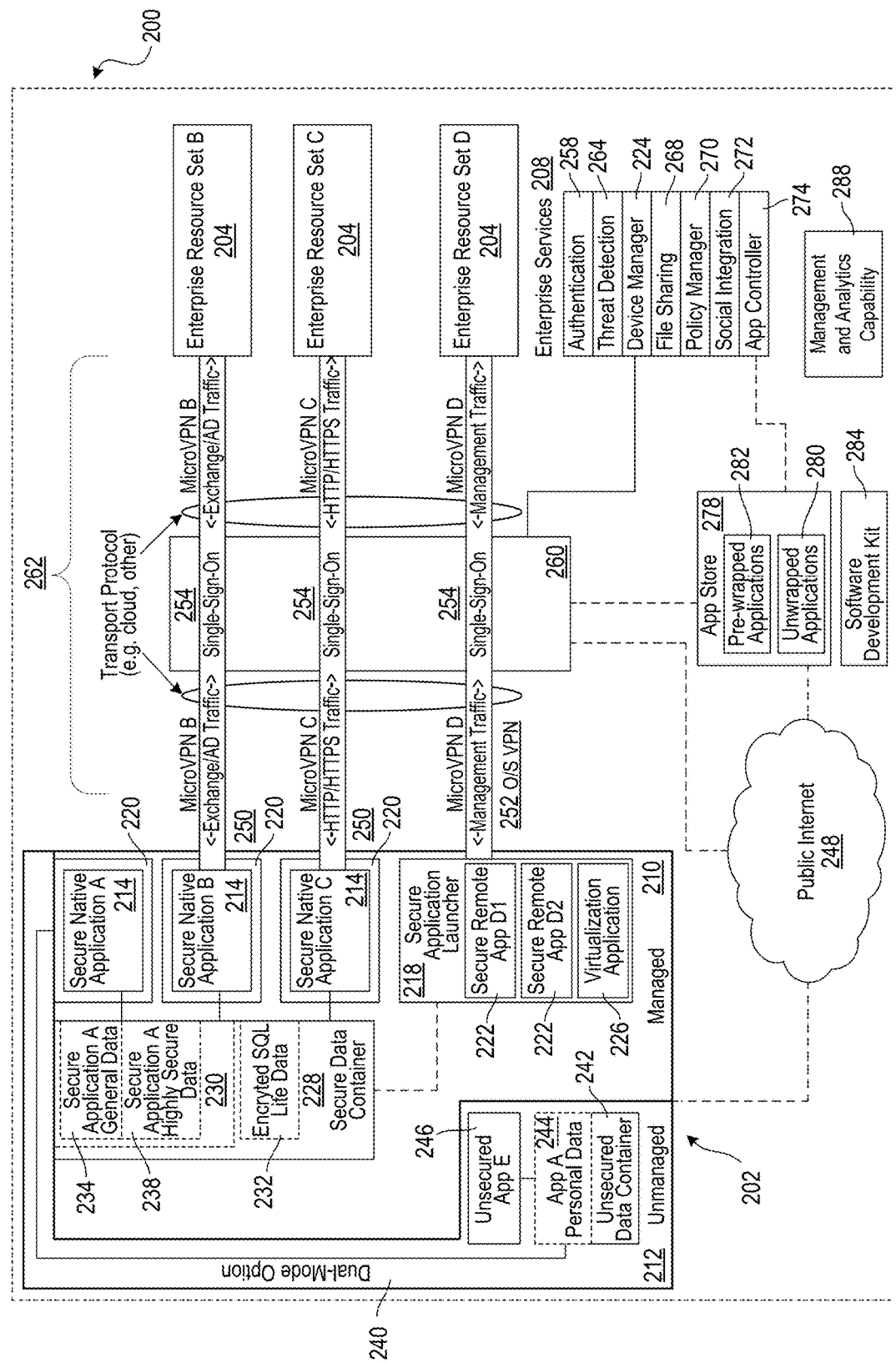
FIG. 2 depicts an illustrative enterprise mobility management system.

FIG. 2 represents an enterprise mobility technical architecture 200 for use in a "Bring Your Own Device" (BYOD) environment. The architecture enables a user of a mobile device 202 (which may, e.g., correspond to client device 402 in FIG. 4) to both access enterprise or personal resources from a mobile device 202 and use the mobile device 202 for personal use. The user may access such enterprise resources 204 or enterprise services 208 (e.g., available at, for example, third party service provider 404, which is shown in FIG. 4) using a mobile device 202 that is purchased by the user or a mobile device 202 that is provided by the enterprise to the user. The user may utilize the mobile device 202 for business use only or for business and personal use. The mobile device 202 may run an iOS operating system, an Android operating system, or the like. The enterprise may choose to implement policies to manage the mobile device 202. The policies may be implemented through a firewall or gateway in such a way that the mobile device 202 may be identified, secured or security verified, and provided selective or full access to the enterprise resources (e.g., 204 and 208.) The policies may be mobile device management policies, mobile application management policies, mobile data management policies, or some combination of mobile device, application, and data management policies. A mobile device 202 that is managed through the application of mobile device management policies may be referred to as an enrolled device.

In some embodiments, the operating system of the mobile device 202 may be separated into a managed partition 210 and an unmanaged partition 212. The managed partition 210 may have policies applied to it to secure the applications running on and data stored in the managed partition 210. The applications running on the managed partition 210 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 202. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 214, secure remote applications 222 executed by a secure application launcher 218, virtualization applications 226 executed by a secure application launcher 218, and the like. The secure native applications 214 may be wrapped by a secure application wrapper 220. The secure application wrapper 220 may include integrated policies that are executed on the mobile device 202 when the secure native application 214 is executed on the mobile device 202. The secure application wrapper 220 may include meta-data that points the secure native application 214 running on the mobile device 202 to the resources hosted at the enterprise (e.g., 204 and 208) that the secure native application 214 may require to complete the task requested upon execution of the secure native application 214. The secure remote applications 222 executed by a secure application launcher 218 may be executed within the secure application launcher 218. The virtualization applications 226 executed by a secure application launcher 218 may utilize resources on the mobile device 202, at the enterprise resources 204, and the like. The resources used on the mobile device 202 by the virtualization applications 226 executed by a secure application launcher 218 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 204, and the like. The resources used at the enterprise resources 204 by the virtualization applications 226 executed by a secure application launcher 218 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 226 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 202, this arrangement may also be elected for certain applications. For example, while some applications may be secured for use on the mobile device 202, others might not be prepared or appropriate for deployment on the mobile device 202 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 202 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 202 as well as a virtualization application 226 to allow access to applications that are deemed more properly operated on the server side. In an embodiment, the virtualization application 226 may store some data, files, etc. on the mobile device 202 in one of the secure storage locations. An enterprise, for example, may elect to allow certain information to be stored on the mobile device 202 while not permitting other information.

In connection with the virtualization application 226, as described herein, the mobile device 202 may have a virtualization application 226 that is designed to present GUIs and then record user interactions with the GUI. The virtualization application 226 may communicate the user interactions to the server side to be used by the server side application as user interactions with the application. In response, the application on the server side may transmit back to the mobile device 202 a new GUI. For example, the new GUI may be a static page, a dynamic page, an animation, or the like, thereby providing access to remotely located resources.

The secure applications 214 may access data stored in a secure data container 228 in the managed partition 210 of the mobile device 202. The data secured in the secure data container may be accessed by the secure native applications 214, secure remote applications 222 executed by a secure application launcher 218, virtualization applications 226 executed by a secure application launcher 218, and the like. The data stored in the secure data container 228 may include files, databases, and the like. The data stored in the secure data container 228 may include data restricted to a specific secure application 230, shared among secure applications 232, and the like. Data restricted to a secure application may include secure general data 234 and highly secure data 238. Secure general data may use a strong form of encryption such as Advanced Encryption Standard (AES) 128-bit encryption or the like, while highly secure data 238 may use a very strong form of encryption such as AES 256-bit encryption. Data stored in the secure data container 228 may be deleted from the mobile device 202 upon receipt of a command from the device manager 224. The secure applications (e.g., 214, 222, and 226) may have a dual-mode option 240. The dual mode option 240 may present the user with an option to operate the secured application in an unsecured or unmanaged mode. In an unsecured or unmanaged mode, the secure applications may access data stored in an unsecured data container 242 on the unmanaged partition 212 of the mobile device 202. The data stored in an unsecured data container may be personal data 244. The data stored in an unsecured data container 242 may also be accessed by unsecured applications 246 that are running on the unmanaged partition 212 of the mobile device 202. The data stored in an unsecured data container 242 may remain on the mobile device 202 when the data stored in the secure data container 228 is deleted from the mobile device 202. An enterprise may want to delete from the mobile device 202 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 202 may connect to enterprise resources 204 and enterprise services 208 at an enterprise, to the public Internet 248, and the like. The mobile device 202 may connect to enterprise resources 204 and enterprise services 208 through virtual private network connections. The virtual private network connections, also referred to as microVPN or application-specific VPN, may be specific to particular applications (as illustrated by microVPNs 250, particular devices, particular secured areas on the mobile device (as illustrated by O/S VPN 252), and the like. For example, each of the wrapped applications in the secured area of the mobile device 202 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 254. The single-sign-on processes may allow a user to provide a single set of authentication credentials, which are then verified by an authentication service 258. The authentication service 258 may then grant to the user access to multiple enterprise resources 204, without requiring the user to provide authentication credentials to each individual enterprise resource 204.

The virtual private network connections may be established and managed by an access gateway 260. The access gateway 260 may include performance enhancement features that manage, accelerate, and improve the delivery of enterprise resources 204 to the mobile device 202. The access gateway 260 may also re-route traffic from the mobile device 202 to the public Internet 248, enabling the mobile device 202 to access publicly available and unsecured applications that run on the public Internet 248. The mobile device 202 may connect to the access gateway via a transport network 262. The transport network 262 may use one or more transport protocols and may be a wired network, wireless network, cloud network, local area network, metropolitan area network, wide area network, public network, private network, and the like.

The enterprise resources 204 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 204 may be premise-based resources, cloud-based resources, and the like. The enterprise resources 204 may be accessed by the mobile device 202 directly or through the access gateway 260. The enterprise resources 204 may be accessed by the mobile device 202 via the transport network 262.

The enterprise services 208 may include authentication services 258, threat detection services 264, device manager services 224, file sharing services 268, policy manager services 270, social integration services 272, application controller services 274, and the like. Authentication services 258 may include user authentication services, device authentication services, application authentication services, data authentication services, and the like. Authentication services 258 may use certificates. The certificates may be stored on the mobile device 202, by the enterprise resources 204, and the like. The certificates stored on the mobile device 202 may be stored in an encrypted location on the mobile device 202, the certificate may be temporarily stored on the mobile device 202 for use at the time of authentication, and the like. Threat detection services 264 may include intrusion detection services, unauthorized access attempt detection services, and the like. Unauthorized access attempt detection services may include unauthorized attempts to access devices, applications, data, and the like. Device management services 224 may include configuration, provisioning, security, support, monitoring, reporting, and decommissioning services. File sharing services 268 may include file management services, file storage services, file collaboration services, and the like. Policy manager services 270 may include device policy manager services, application policy manager services, data policy manager services, and the like. Social integration services 272 may include contact integration services, collaboration services, integration with social networks such as Facebook, Twitter, and LinkedIn, and the like. Application controller services 274 may include management services, provisioning services, deployment services, assignment services, revocation services, wrapping services, and the like.

The enterprise mobility technical architecture 200 may include an application store 278. The application store 278 may include unwrapped applications 280, pre-wrapped applications 282, and the like. Applications may be populated in the application store 278 from the application controller 274. The application store 278 may be accessed by the mobile device 202 through the access gateway 260, through the public Internet 248, or the like. The application store 278 may be provided with an intuitive and easy to use user interface.

A software development kit 284 may provide a user the capability to secure applications selected by the user by wrapping the application as described previously in this description. An application that has been wrapped using the software development kit 284 may then be made available to the mobile device 202 by populating it in the application store 278 using the application controller 274.

The enterprise mobility technical architecture 200 may include a management and analytics capability 288. The management and analytics capability 288 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 3:
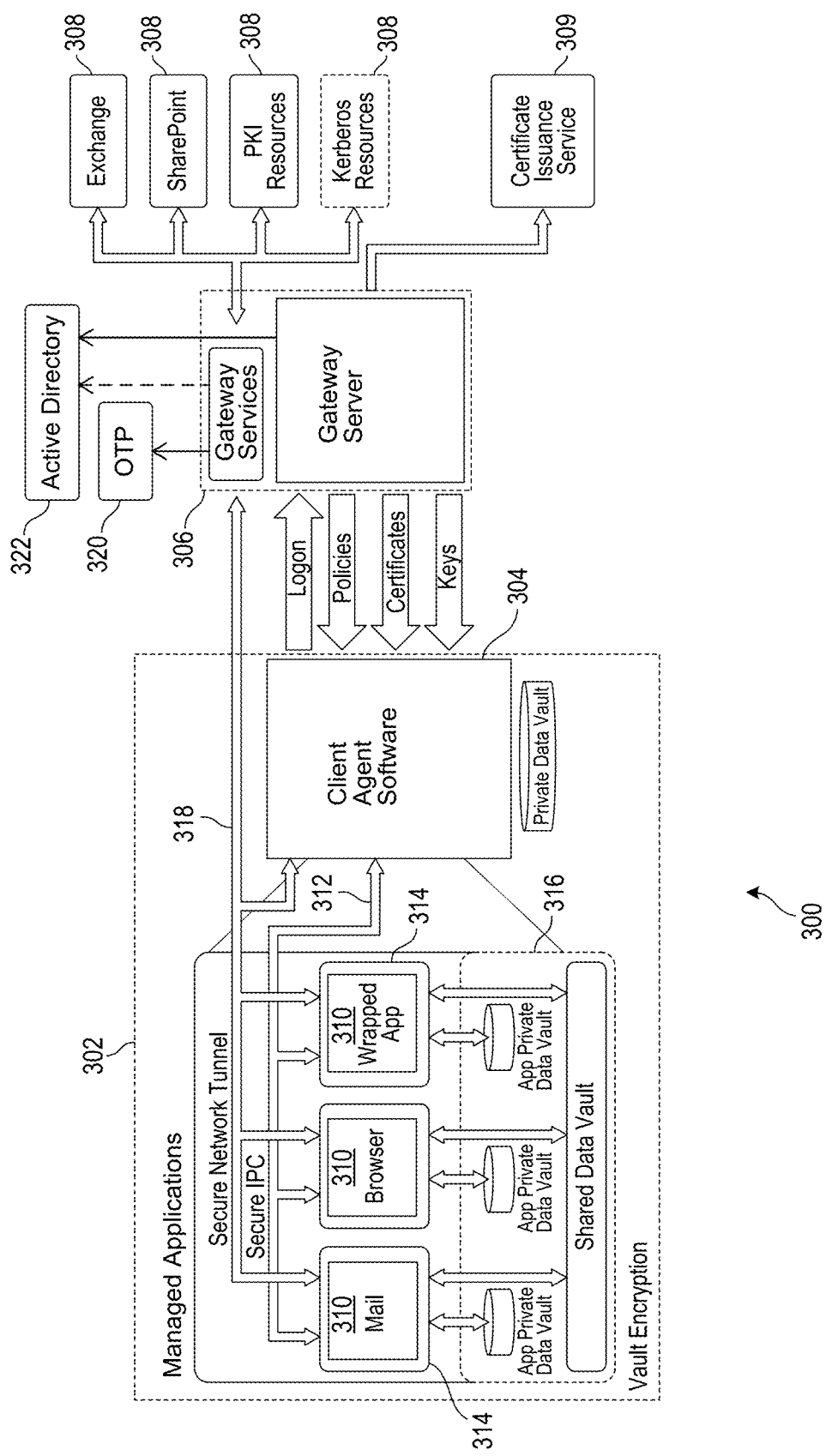
FIG. 3 depicts another illustrative enterprise mobility management system.

FIG. 3 is another illustrative enterprise mobility management system 300. Some of the components of the mobility management system 200 described above with reference to FIG. 2 have been omitted for the sake of simplicity. The architecture of the system 300 depicted in FIG. 3 is similar in many respects to the architecture of the system 200 described above with reference to FIG. 2 and may include additional features not mentioned above.

In this case, the left hand side represents an enrolled mobile device 302 with a client agent 304, which interacts with gateway server 306 (which includes Access Gateway and application controller functionality) to access various enterprise resources 308 and services 309 such as Exchange, Sharepoint, public-key infrastructure (PKI) Resources, Kerberos Resources, Certificate Issuance service, as shown on the right hand side above. Although not specifically shown, the mobile device 302 may also interact with an enterprise application store (StoreFront) for the selection and downloading of applications.

The client agent 304 acts as the UI (user interface) intermediary for Windows apps/desktops hosted in an Enterprise data center, which are accessed using the High-Definition User Experience (HDX)/ICA display remoting protocol. The client agent 304 also supports the installation and management of native applications on the mobile device 302, such as native iOS or Android applications. For example, the managed applications 310 (mail, browser, wrapped application) shown in the figure above are all native applications that execute locally on the mobile device 302. Client agent 304 and application management framework of this architecture act to provide policy driven management capabilities and features such as connectivity and SSO (single sign on) to enterprise resources/services 308. The client agent 304 handles primary user authentication to the enterprise, normally to Access Gateway (AG) 306 with SSO to other gateway server components. The client agent 304 obtains policies from gateway server 306 to control the behavior of the managed applications 310 on the mobile device 302.

The Secure InterProcess Communication (IPC) links 312 between the native applications 310 and client agent 304 represent a management channel, which may allow a client agent to supply policies to be enforced by the application management framework 314 "wrapping" each application. The IPC channel 312 may also allow client agent 304 to supply credential and authentication information that enables connectivity and SSO to enterprise resources 308. Finally, the IPC channel 312 may allow the application management framework 314 to invoke user interface functions implemented by client agent 304, such as online and offline authentication.

Communications between the client agent 304 and gateway server 306 are essentially an extension of the management channel from the application management framework 314 wrapping each native managed application 310. The application management framework 314 may request policy information from client agent 304, which in turn may request it from gateway server 306. The application management framework 314 may request authentication, and client agent 304 may log into the gateway services part of gateway server 306 (for example, Citrix Gateway). Client agent 304 may also call supporting services on gateway server 306, which may produce input material to derive encryption keys for the local data vaults 316, or may provide client certificates which may enable direct authentication to PKI protected resources, as more fully explained below.

In more detail, the application management framework 314 "wraps" each managed application 310. This may be incorporated via an explicit build step, or via a post-build processing step. The application management framework 314 may "pair" with client agent 304 on first launch of an application 310 to initialize the Secure IPC channel 312 and obtain the policy for that application. The application management framework 314 may enforce relevant portions of the policy that apply locally, such as the client agent login dependencies and some of the containment policies that restrict how local OS services may be used, or how they may interact with the managed application 310.

The application management framework 314 may use services provided by client agent 304 over the Secure IPC channel 312 to facilitate authentication and internal network access. Key management for the private and shared data vaults 316 (containers) may be also managed by appropriate interactions between the managed applications 310 and client agent 304. Vaults 316 may be available only after online authentication, or may be made available after offline authentication if allowed by policy. First use of vaults 316 may require online authentication, and offline access may be limited to at most the policy refresh period before online authentication is again required.

Network access to internal resources may occur directly from individual managed applications 310 through Access Gateway 306. The application management framework 314 may be responsible for orchestrating the network access on behalf of each managed application 310. Client agent 304 may facilitate these network connections by providing suitable time limited secondary credentials obtained following online authentication. Multiple modes of network connection may be used, such as reverse web proxy connections and end-to-end VPN-style tunnels 318.

The Mail and Browser managed applications 310 have special status and may make use of facilities that might not be generally available to arbitrary wrapped applications. For example, the Mail application 310 may use a special background network access mechanism that allows it to access an Exchange server 308 over an extended period of time without requiring a full AG logon. The Browser application 310 may use multiple private data vaults 316 to segregate different kinds of data.

This architecture may support the incorporation of various other security features. For example, gateway server 306 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 306 may identify managed native applications 310 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 316 (containers) on the mobile device 302. The vaults 316 may be encrypted so that all on-device data including files, databases, and configurations are protected. For on-line vaults, the keys may be stored on the server (gateway server 306), and for off-line vaults, a local copy of the keys may be protected by a user password or biometric validation. If or when data is stored locally on the mobile device 302 in the secure container 316, it may be preferred that a minimum of AES 256 encryption algorithm be utilized.

Other secure container features may also be implemented. For example, a logging feature may be included, wherein security events happening inside a managed application 310 may be logged and reported to the backend. Data wiping may be supported, such as if or when the managed application 310 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 302 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 314 may be prevented in other ways. For example, if or when a managed application 310 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 320 without the use of an AD (active directory) 322 password for access to one or more applications. In some cases, some users do not know (or are not permitted to know) their AD password, so these users may authenticate using an OTP 320 such as by using a hardware OTP system like SecurID (OTPs may be provided by different vendors also, such as Entrust or Gemalto). In some cases, after a user authenticates with a user ID, a text may be sent to the user with an OTP 320. In some cases, this may be implemented only for online use, with a prompt being a single field.

An offline password may be implemented for offline authentication for those managed applications 310 for which offline use is permitted via enterprise policy. For example, an enterprise may want StoreFront to be accessed in this manner In this case, the client agent 304 may require the user to set a custom offline password and the AD password is not used. Gateway server 306 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 310 as secondary credentials (for the purpose of accessing PKI protected web resources via the application management framework micro VPN feature). For example, a managed application 310 may utilize such a certificate. In this case, certificate-based authentication using ActiveSync protocol may be supported, wherein a certificate from the client agent 304 may be retrieved by gateway server 306 and used in a keychain. Each managed application 310 may have one associated client certificate, identified by a label that is defined in gateway server 306.

Gateway server 306 may interact with an enterprise special purpose web service to support the issuance of client certificates to allow relevant managed applications to authenticate to internal PKI protected resources.

The client agent 304 and the application management framework 314 may be enhanced to support obtaining and using client certificates for authentication to internal PKI protected network resources. More than one certificate may be supported, such as to match various levels of security and/or separation requirements. The certificates may be used by the Mail and Browser managed applications 310, and ultimately by arbitrary wrapped applications 310 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 310 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 302 is authenticated to the enterprise, and vice versa. Virtual smart cards for authentication to gateway server 306 may also be implemented.

Another feature may relate to application container locking and wiping, which may automatically occur upon jailbreak or rooting detections, and occur as a pushed command from administration console, and may include a remote wipe functionality even when a managed application 310 is not running.

A multi-site architecture or configuration of enterprise application store and an application controller may be supported that allows users to be serviced from one of several different locations in case of failure.

In some cases, managed applications 310 may be allowed to access a certificate and private key via an API (for example, OpenSSL). Trusted managed applications 310 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Figure 4A:
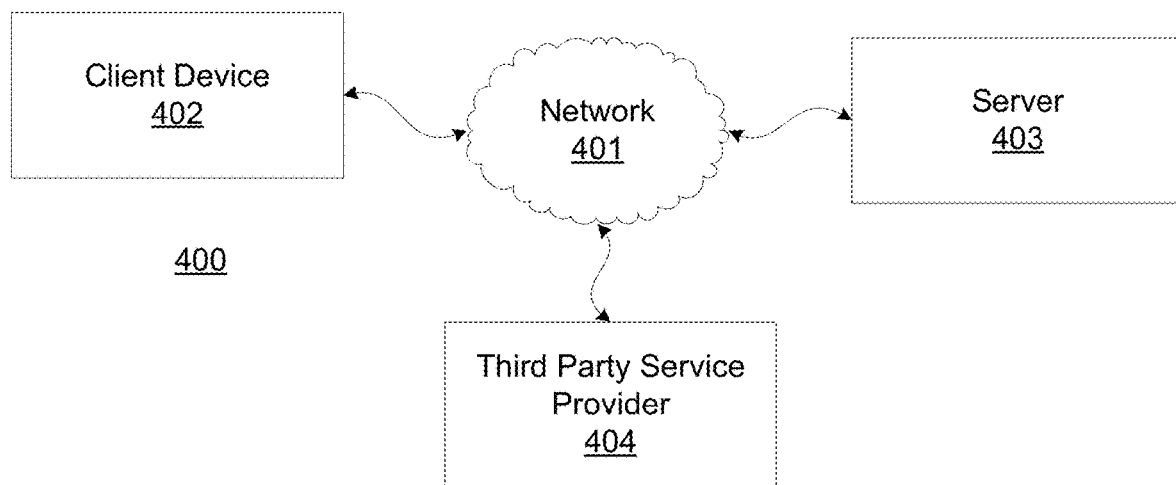
FIGS. 4A and 4B depict an illustrative computing environment for injection of tokens or client certificates in managed application communication in accordance with one or more illustrative aspects described herein.
Figure 4B:
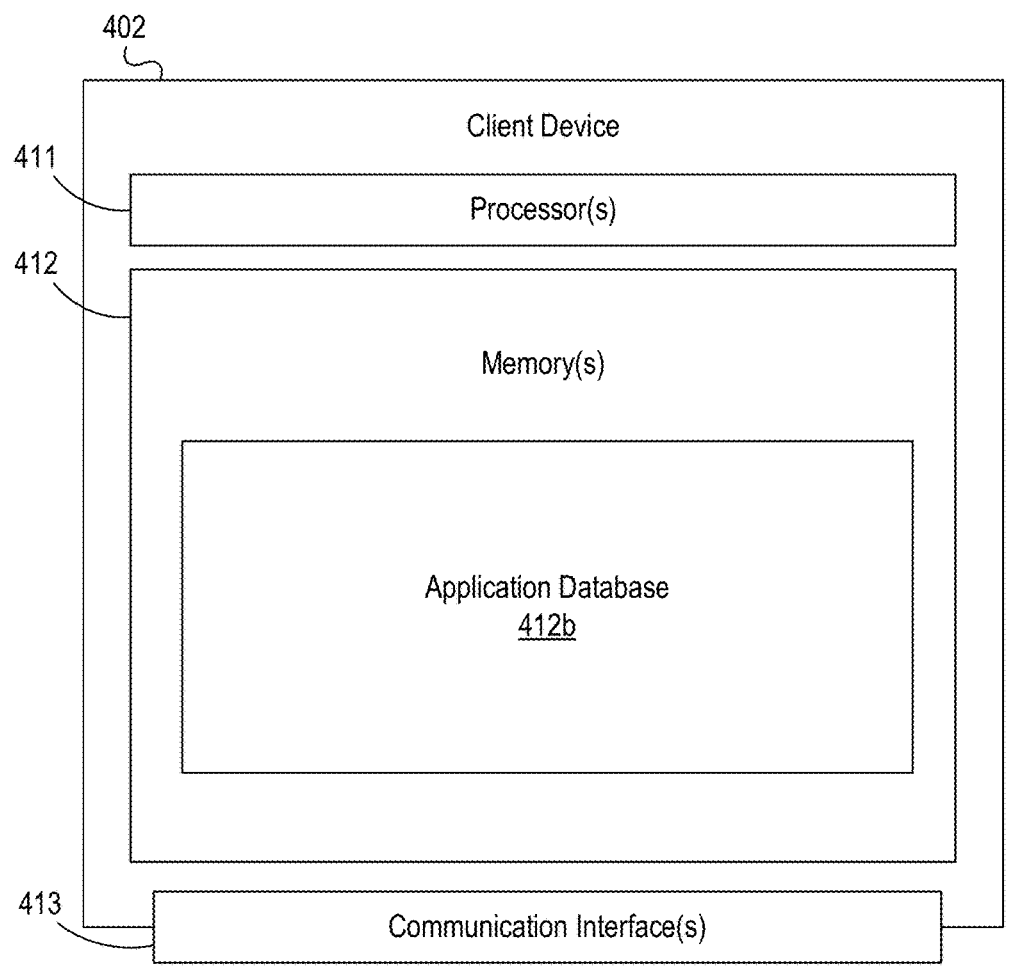

Injection of Tokens or Client Certificates for Managed Application Communication FIGS. 4A and 4B depict an illustrative computing environment for injection of tokens or client certificates for managed application communication in accordance with one or more illustrative aspects described herein. Referring to FIG. 4A, computing environment 400 may include one or more computer systems. For example, computing environment 400 may include a client device 402, a server 403, and a third party service provider 404.

As illustrated in greater detail below, client device 402 may be a personal computing device such as a smartphone, tablet, laptop computer, desktop computer, or the like. In some instances, client device 402 may be configured to host one or more managed applications, and to make requests (e.g., to server 403, third party service provider 404, or the like) on behalf of the managed applications.

Server 403 may be a computer system that includes one or more computing devices (e.g., servers, server blades, or the like) and/or other computer components (e.g., processors, memories, communication interfaces). In one or more instances, server 403 may be configured to generate endpoint server lists of various service providers (e.g., third party service provider 404, or the like). Additionally or alternatively, server 403 may be configured to generate and/or validate tokens or client certificates that may be injected, inserted, or otherwise combined with communications between the client device 402 and the third party service provider 404, and to authenticate the client device 402 to the third party service provider 404. In some instances, the server 403 may be controlled, maintained, or otherwise operated by an organization or entity (e.g., an enterprise organization corresponding to a management framework running on client device 402). In some instances, the server 403 may be configured to affect behavior of a managed application executed by another computing device (e.g., client device 402, or the like).

In one or more instances, third party service provider 404 may be or include one or more computing devices (e.g., servers, server blades, or the like) configured to host one or more third party services, which may be accessible by the client device 402 through the use of managed applications (e.g., applications created by an enterprise organization corresponding to the third party service provider, managed or otherwise controlled by a different enterprise organization corresponding to the server 403, and running on the client device 402). For example, the third party service provider 404 may host an electronic messaging service, or the like. In some instances, the third party service provider 404 may be configured to authenticate the client device 402 based on tokens or client certificates included in communications between the client device 402 and the third party service provider 404. In some instances, the third party service provider 404 may be controlled, maintained, or otherwise operated by another organization (e.g., corresponding to a third party service) different than the enterprise organization that operates or otherwise manages the server 403. In some instances, third party service provider 404 may be a computing resource located at a remote location from the client device 402 and/or the server 403.

Computing environment 400 may also include one or more networks, which may interconnect client device 402, server 403, and third party service provider 404. For example, computing environment 400 may include a wired or wireless network 401 (which may e.g., interconnect client device 402, server 403, and third party service provider 404).

In one or more arrangements, client device 402, server 403, third party service provider 404, and/or the other systems included in computing environment 400 may be any type of computing device capable of receiving a user interface (e.g., browser interface, virtual desktop interface, or the like), receiving input via the user interface, and communicating the received input to one or more other computing devices. For example, client device 402, server 403, third party service provider 404, and/or the other systems included in computing environment 400 may in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of client device 402, server 403, and third party service provider 404 may, in some instances, be special purpose computing devices configured to perform specific functions.

Referring to FIG. 4B, client device 402 may include one or more processors 411, memory 412, and communication interface 413. A data bus may interconnect processor 411, memory 412, and communication interface 413. Communication interface 413 may be a network interface configured to support communication between the client device 402 and one or more networks (e.g., network 701, or the like). Memory 412 may include one or more program modules having instructions that when executed by processor 411 cause client device 402 to perform one or more functions described herein and/or access one or more databases that may store and/or otherwise maintain information which may be used by such program modules and/or processor 411. In some instances, the one or more program modules and/or databases may be stored by and/or maintained in different memory units of client device 402 and/or by different computing devices that may form and/or otherwise make up client device 402. For example, memory 412 may have, host, store, and/or include instructions that direct and/or otherwise cause client device 402 to intercept requests from applications (e.g., which may be stored in application database 412b) and to inject tokens or client certificates into the requests prior to the requests passing through to a destination device (e.g., third party service provider 404, or the like). An application database 412b may store data, instructions, or the like that may support operation of one or more managed applications stored at the client device 402 (e.g., managed applications, or the like). In some instances, these managed applications may be applications wrapped with a software layer that allows for intercepting operating system calls, framework calls, or the like and/or an application that uses an explicit software development kit (SDK) to make operating system calls, framework calls, or the like. In some instances, the client device 402 may be enrolled in a mobile device management (MDM) solution. In other instances, the client device 402 might not be enrolled in a MDM solution or offer MDM support.

Figure 5A:
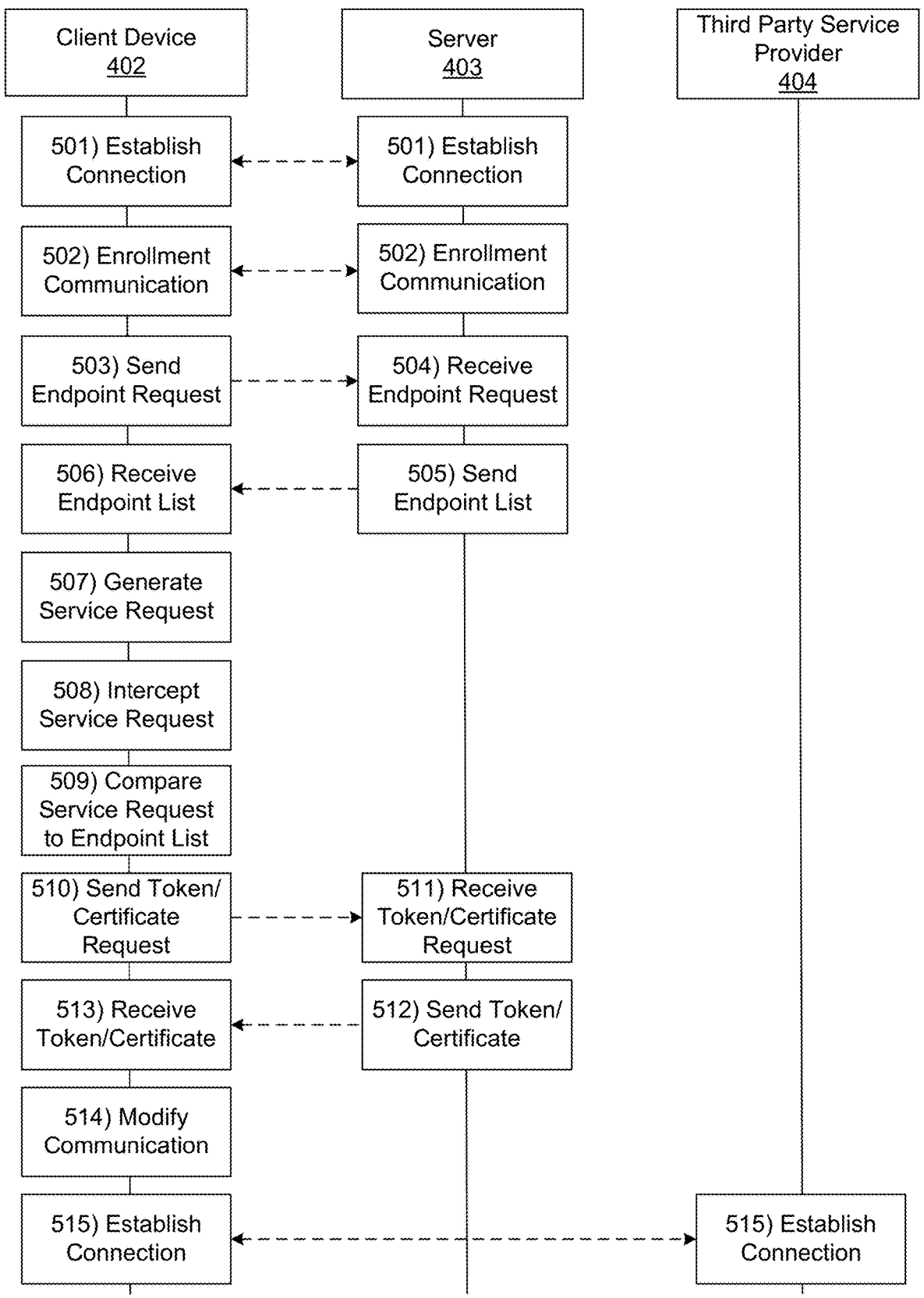
FIGS. 5A and 5B depict an illustrative event sequence for injection of tokens or client certificates in managed application communication in accordance with one or more illustrative aspects described herein.
Figure 5B:
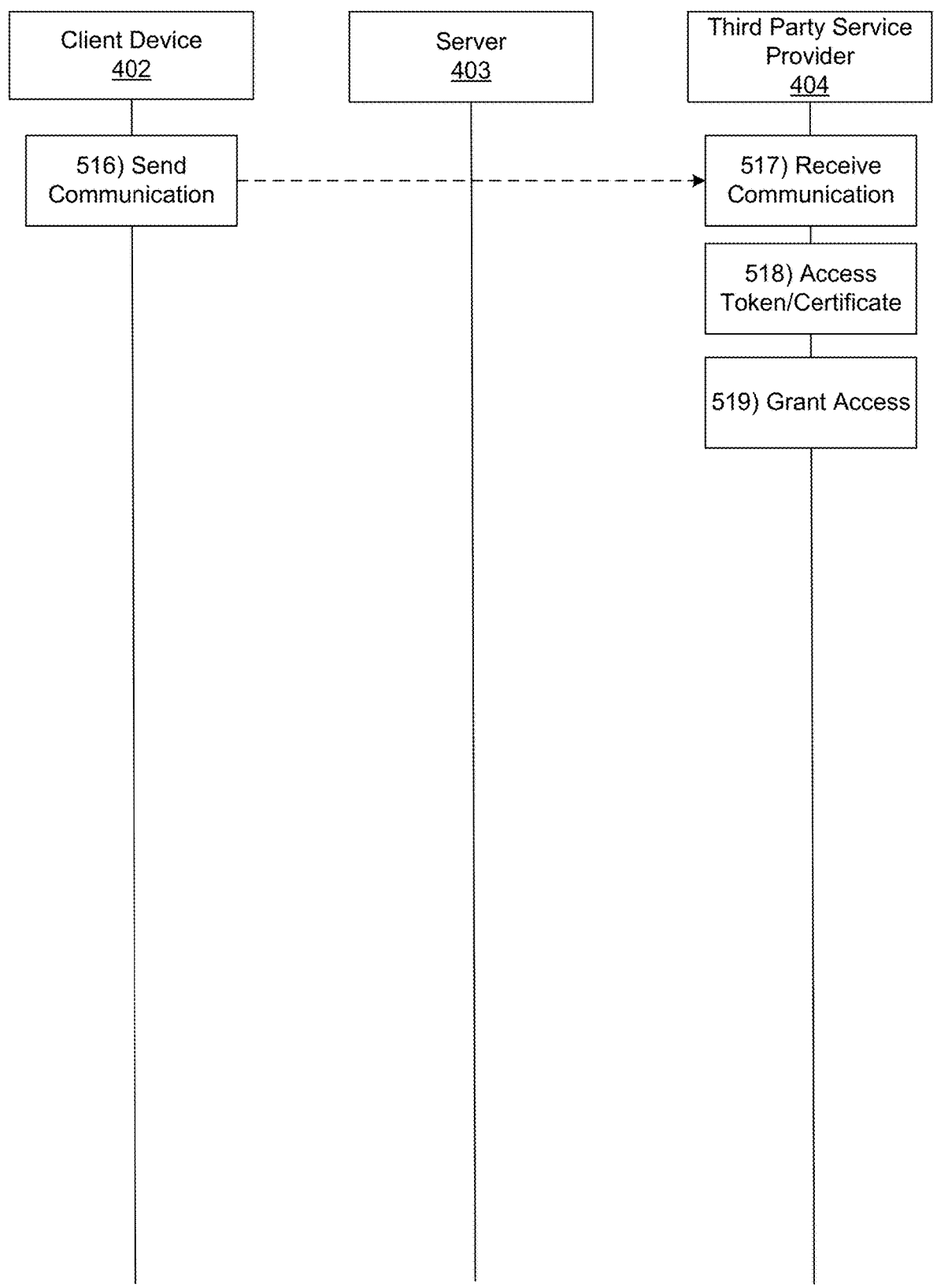

FIGS. 5A and 5B depict an illustrative event sequence for performing automated injection of tokens or client certificates for managed application communication in accordance with one or more illustrative aspects described herein. For convenience, steps 501-519 are shown across FIGS. 5A and 5B. However, it should be understood that steps 501-519 represent a single event sequence (e.g., step 516 in FIG. 5B may follow step 515 in FIG. 5A). Referring to FIG. 5A, at step 501, client device 402 may establish a connection with server 403. For example, the client device 402 may establish a first wireless data connection with server 403 to link the client device 402 to the server 403 (e.g., in preparation for authenticating the client device 402 with the server 403). In some instances, the client device 402 may identify whether or not a connection is already established with the server 403. If a connection is already established with the server 403, the client device 402 might not re-establish the connection. If a connection is not yet established with the server 403, the client device 402 may establish the connection as described herein.

At step 502, the client device 402 may communicate with the server 403 to register, enroll, and/or authenticate the client device 402 with the server 403. For example, the client device 402 may receive user input such as a user name and password, which may be shared with the server 403 for authentication. In instances whether the client device 402 is registering or enrolling with the server 403, an initial user name and/or password may be established. In some instances, the client device 402 may communicate with the server 403 via the communication interface 413 and while the first wireless data connection is established.

At step 503, the client device 402 may send a request to the server 403 requesting one or more lists of server endpoints for which the client device 402 should modify communication behavior. In some instances, the one or more lists of server endpoints may be one or more of: a regex of domains (e.g., ".domain.com," or the like), a regex of URLs, a list of specific server endpoints, or the like. In some instances, the one or more lists of server endpoints may be used by the client device 402 for a distinct purpose. In some instances, the client device 402 may request the one or more lists of server endpoints during the communication with the server 403 at step 502. In other instances, the client device 402 may request the one or more lists of server endpoints at a periodic interval. In yet other instances, the client device 402 might not request the one or more lists of server endpoints, and rather the server 403 may download the one or more lists of server endpoints to the client device 402 without being prompted by a request. In some instances, the client device 402 may send the request for the one or more lists of server endpoints to the server 403 via the communication interface 413 and while the first wireless data connection is established.

At step 504, the server 403 may receive the request for the one or more lists of server endpoints (e.g., sent at step 503). In some instances, the server 403 may receive the request for the one or more lists of server endpoints while the first wireless data connection is established.

At step 505, the server 403 may identify the one or more lists of server endpoints and may send the one or more lists of server endpoints to the client device 402. For example, the server 403 may access a backend infrastructure corresponding to a third party service to identify a corresponding list of server endpoints. In some instances, the server 403 may send the one or more lists of server endpoints to the client device 402 while the first wireless data connection is established. For example, the server 403 may identify and send a regex of certain domains, a regex of URLs, a list of specific server endpoints, or the like.

At step 506, the client device 402 may receive the one or more lists of server endpoints sent at step 505. For example, the client device 402 may receive the one or more lists of server endpoints via the communication interface 113 and while the first wireless data connection is established. In some instances, the one or more lists of server endpoints may include third party service provider 404.

At step 507, the client device 402 may generate a service request at a managed application hosted by the client device 402. For example, the client device 402 may receive a user input within a managed application requesting access to a third party service or otherwise providing a query to be fulfilled by a third party service. In some instances, the client device 402 may generate and send an outbound request (e.g., an HTTP/HTTPs request, or the like) from the managed application to the third party service.

At step 508, the client device 402 may intercept the service request, generated at step 507, at a management framework. For example, the client device 402 may intercept the service request at the management framework prior to sending the service request to the third party service provider 404 for processing. More specifically, the client device 402 may prevent the service request from initially being sent or otherwise transmitted to the third party service provider 404, and may perform the actions described below at step 509 (and subsequently at steps 510-514 if the service request is determined to be a request for an endpoint contained in at least one of the server endpoint lists). In some instances, this management framework may allow for control of the managed application (which may e.g., be executable on the client device 402), such as by applying an enterprise's security policies or other desired configuration.

At step 509, the client device 402 may use the management framework to identify whether the service request comprises a request to an endpoint contained in at least one of the server endpoint lists (e.g., by comparing the endpoint identified in the service request to the one or more lists of server endpoints received at step 506). For example, the client device 402 may apply a matching function based on endpoint information in the service request and endpoint information corresponding to the endpoints in the server endpoint lists. If the client device 402 determines based on the above comparison that the service request is a request to an endpoint contained in at least one of the server endpoint lists, the client device 402 may proceed to step 510. If the client device 402 determines based on the above comparison that the service request is not a request to an endpoint contained in at least one of the server endpoint lists, the client device 402 may proceed to step 515.

At step 510, the client device 402 may use a local framework, deployed by the server 403 and used to affect the behavior of the managed application, (e.g., the management framework) to request tokens or client certificates from the server 403. For example, the client device 402 may use the management framework to make a call to the server 403 to get a token for the endpoint corresponding to the service request. Additionally or alternatively, the client device 402 may use the management framework to make a call to the server 403 to get a TLS client certificate for the endpoint corresponding to the service request. At step 511, the server 403 may receive the request for tokens or client certificates sent at step 510.

At step 512, the server 403 may send the token or client certificate to the client device 402. In some instances, the server 403 may generate a token for the endpoint corresponding to the service request. In these instances, the server 403 may generate a token that is opaque to the management framework and is configured for processing, validation, or the like exclusively by the server 403. For example, the token may be in a proprietary format of the server 403, and other recipients of the token (e.g., client device 402, third party service provider 404, or the like) must contact the server 403 to validate the token. In generating the token, the server 403 may generate a random series of bits mapped (e.g., in a mapping table) to one or more of: a specific user, device, time, endpoint, or the like. In these instances, the server 403 may generate a token that is unable to be parsed by the client device 402. In addition, the server 403 itself may be unable to decrypt the token, but may be configured to look up an identity of the client device 402 using the mapping table (which may contain relationships between the bit series and the identification information). Additionally or alternatively, in generating the token, the server 403 may generate a hash of one or more of: a specific user, device, expiration time, salt, server address, or the like. In some instances, in generating the token, the server 403 may generate a token that is time limited, and that becomes invalid upon expiration of a predetermined period of time. In some instances, in generating the token, the server 403 may generate the token based on information received from the client device 402 during the registration/enrollment process described at step 502. In doing so, the server 403 may avoid subsequent communication with the client device 402 to collect information that has already been collected during an enrollment or registration process.

In some instances, the server 403 may generate a client certificate (e.g., a TLS client certificate, or the like) for the endpoint corresponding to the service request. For example, the server 403 may generate an X.509 certificate that has "Client Authentication" listed in its field for enhanced key usage, which may, for example, allow the X.509 certificate to be used as an authentication credential. In some instances, the server 403 may generate the TLS client certificate from a private Certificate Authority certificate held by the server 403. In these instances, a private key for the Certificate Authority may be distributed to all enterprise service endpoints in the one or more lists of service endpoints. In other instances, the TLS client certificate may be self-signed (e.g., by the client device 402). In generating the TLS client certificate, the server 403 may generate a certificate with a number of inherent properties in plain text that may be of use to any server (e.g., third party service provider 404) including, but not limited to the "Subject Key Identifier" which acts as a unique identifier for that client certificate. In some instances, this unique identifier may be used by the server 403 to map the certificate to a specific user, device, undisclosed timestamp (e.g., to limit replay attacks), and/or any other information that the server 403 knows about the user or device. In some instances, the server 403 may extend the TLS client certificate with additional properties (e.g., service endpoint, device location, other endpoint information, and/or any other information the server 403 knows about the registered device and/or user), and may, in some instances, encrypt the values of these additional properties before adding them to the TLS client certificate (which may e.g., provide additional security and/or confidentiality with regard to these properties). For example, the server 403 may include additional information in the TLS client certificate that would not otherwise be included in the TLS client certificate. Additionally or alternatively, the server 403 may place a randomly generated lookup identifier in the value itself, and may maintain a mapping of lookup identifiers to information about the user and/or device. In some instances, in generating the client certificate, the server 403 may generate the client certificate based on information received from the client device 402 during the registration/enrollment process described at step 502. In some instances, the server 403 may be configured with a root certificate, which may enable the server 403 to generate the client certificate. In these instances, the third party service provider 404 may be configured with a public key for the root certificate that may enable the third party service provider 404 to validate the client certificate.

At step 513, the client device 402 may receive the token or client certificate sent at step 512. In some instances, the client device 402 may receive the token or client certificate at the management framework. For example, the client device 402 may receive the token or client certificate at the management framework because the service request was intercepted and held at the management framework, the client device 402 may use the management framework to receive the token or client certificate so that it may be used to modify the service request and/or future network communications intercepted at the management framework (e.g., rather than downloading the token or client certificate into the application itself).

In some instances, rather than communicating with the server 403 after the service request is generated at the client device 402, the client device 402 may pre-fetch (e.g., request, receive, or the like) the token or client certificate in response to launching a managed application, after receiving the one or more lists of service endpoints, or the like. Additionally or alternatively, rather than communicating with the server 403 to establish the token or client certificate, the client device 402 may use the management framework to generate the token (e.g., for use in maintaining session stickiness between the client device 402 and the third party service provider 404 via a load balancer). For example, the client device 402 may use locally stored information to produce a self-signed certificate.

At step 514, the client device 402 may modify future network communications (which may, in some instances, include the service request) to include the token or client certificate. For example, the client device 402 may modify the future network communications to include the token as an additional HTTP header or inert the token into available metadata, extensions, or the like of the communication protocol being used (e.g., SFTP, FTPS, or the like). As another example, the client device 402 may modify the future network communications to include the TLS client certificate during a TLS handshake. The client device 402 may modify the future network communications in other similar methods without departing from the scope of the disclosure.

In some instances, in modifying the future network communications, the client device 402 may modify the future network communications to include an identifier (e.g., token, client certificate, or the like), that enable the future network communications to be routed to a remote resource (e.g., third party service provider 404, or the like) for a given computing session without use of data from the remote resource (e.g., cookies, or the like) or data indicative of a connection of the remote resource in which to receive the future network communications (e.g., internet protocol (IP) address, secure sockets layer (SSL) session identifier, or the like for the third party service provider 404).

At step 515, the client device 402 may establish a connection with the third party service provider 404. For example, the client device 402 may establish a second wireless data connection with the third party service provider 404 to link or otherwise place in communication the client device 402 and the third party service provider 404 (e.g., in preparation for sending the future network communications to the third party service provider 404). In some instances, the client device 402 may identify whether or not a connection is already established with the third party service provider 404. If a connection is already established with the third party service provider 404, the client device 402 might not re-establish the connection. If a connection is not yet established with the third party service provider 404, the client device 402 may establish the second wireless data connection as described herein.

Referring to FIG. 5B, at step 516, the client device 402 may send a communication (e.g., the previously discussed future network communications, service request, or the like) to the third party service provider 404. In some instances (e.g., instances in which the client device 402 determined at step 509 that the communication did not correspond to the one or more lists of service requests), the client device 402 may send an unmodified communication. For example, although the service request may have been intercepted at step 508, the client device 402 may have identified that the communication did not correspond to the one or more lists of service requests at step 509, and may have proceeded to step 516 without performing the intervening actions described in steps 510-515. In other instances (e.g., instances in which the client device 402 determined at step 509 that the communication did correspond to the one or more lists of service requests), the client device 402 may send a modified version of the communication (e.g., that contains the token or client certificate received at step 513). In some instances, the client device 402 may use the management framework to send the communication to the third party service provider 404, and may send the communication to the third party service provider 404 via the communication interface 413 and while the second wireless data connection is established.

In some instances, in sending the communication to the third party service provider 404, the client device 402 may send the communication to a load balancer corresponding to an organization that maintains or otherwise is affiliated with the third party service provider 404 (e.g., before the communication is routed to the third party service provider 404). In these instances, the load balancer may be configured to access the token or client certificate injected or otherwise provided within the communication. For example, in instances where the token or client certificate comprise a token, the load balancer may be configured to perform SSL termination and may be configured to read HTTP headers. Accordingly, the load balancer may use the token to route communications from the client device 402 to the same backend server of the service provider (e.g., third party service provider 404, or the like). This may allow the client device 402 and the third party service provider 404 to maintain session stickiness (e.g., routing of requests from the client device 402 to the same backend server, e.g., third party service provider 404, for all communication) even in situations where the client device 402 switches between network access points and has its internet protocols changed and/or where the client device 402 hosts applications that make direct calls without honoring cookies (e.g., because the load balancer may maintain stored correlations between the token itself and the third party service provider 404). In some instances, the load balancer may maintain a mapping table that stores correlations between tokens and third party service providers. Additionally or alternatively, the load balancer may identify third party service providers corresponding to the tokens using a hash function (e.g., comparing the token to stored hash information in the mapping table).

In instances where the token or client certificate comprise a client certificate, the load balancer may read the client certificate during a TLS handshake with the client device 402, and may use the client certificate to maintain session stickiness. This may allow the client device 402 and the third party service provider 404 to maintain session stickiness even in situations where the client device 402 switches between network access points and has its internet protocols changed and/or where the client device 402 hosts applications that make direct calls without honoring cookies (e.g., because the load balancer may maintain stored correlations between the certificate itself and the third party service provider 404). Accordingly, the load balancer may identify the corresponding third party service provider based on the client certificate (e.g., based on information included in the client certificate, a private key corresponding to the Certificate Authority, or the like).

In some instances, in sending the communication that includes the token or client certificate, the client device 402 may enable action to be taken by the third party service provider 404 on behalf of the client device 402 in response to receipt of the communication (e.g., grant access to a service, process a query, or the like).

At step 517, the third party service provider 404 may receive the communication from the client device 402. In some instances, the third party service provider 404 may receive the communication from the client device 402 while the second wireless data connection is established.

At step 518, the third party service provider 404 may access the token or client certificate from the communication. With regard to the token, the third party service provider 404 may use the token as an authentication token to the third party service provider 404 or a corresponding service, which may allow for single sign-on (e.g., to avoid a secondary method of authentication because the managed application has already been authenticated at step 502). In some instances, the third party service provider 404 and/or another computing device corresponding to an organization that maintains or otherwise controls the third party service provider 404 may be configured to decode the token (e.g., because the third party service provider 404 already knows the token generation algorithm or user-to-token mapping a priori). In other instances, the third party service provider 404 may make a call to the server 403 and request user information corresponding to the token. For example, the server 403 may maintain a mapping table between tokens and user identification information, device identification information, or the like, and may be configured to look up an identify of the client device 402 using the mapping table. Additionally or alternatively, the server 403 may use a private key to validate the token. In these instances, the server 403 may send validation information to the third party service provider 404.

As another example, because the token may contain a device identifier, the third party service provider 404 may use the token as an additional factor in multi-factor authentication. In this example, the third party service provider 404 may already know how to decode the token itself (e.g., as described above), or it may make a call to the server 403 and ask it for device information corresponding to the token (e.g., in which case the server 403 may validate the token and send the validation device information to the third party service provider 404). In doing so, the user authentication experience may become more efficient and consumer friendly (e.g., avoid fingerprint biometrics, codes on secondary devices, or the like).

As yet another example, the third party service provider 404 may use the token as a tracking mechanism (e.g., to identify a location, other endpoint information, or the like corresponding to the client device 402 at the time the service request was sent). In some instances, the third party service provider 404 may already know how to decode the token itself. In other instances, the third party service provider 404 may make a call to the server 403 and to request tracking information (e.g., for a user, the client device 102, the token, or the like) corresponding to the token (e.g., in which case the server 403 may validate the token and send validation information (e.g., an indication that the token has been validated) to the third party service provider 404). In some instances, the third party service provider 404 may use the tracking information for step up authentication to the server endpoint and/or for other purposes.

In some instances, rather than connecting to the server 403 to validate contents of the token, the third party service provider 404 may employ an OAuth/OIDC mechanism. For example, when the managed application requests the token for the service endpoint the server 403 may encode information (e.g., user identifier, device identifier, or the like) with a public key previously registered by the service endpoint, which may, in some instances, enhance security or confidentiality of the information. For example, the third party service provider 404 may send the public key to the server 403 as part of the enrollment communication process described above at step 502.

With regard to the client certificate, in some instances, the third party service provider 404 may use the client certificate as a tracking mechanism to an enterprise's server or service. For example, in receiving the client certificate, the third party service provider 404 may receive encrypted metadata in a way that is automatically enabled without any code change on the client side, which may then be used by the third party service provider 404 to track location, endpoint information, or the like corresponding to the client device 402 at the time the service request was sent. For example, the third party service provider 404 may be configured to validate the client certificate on its own. For example, the server 403 may be configured with a root certificate that enables the server 403 to generate the client certificate. In this example, the third party service provider 404 may be configured with a public key for the root certificate that enables the server 403 to validate the client certificate. As another example, the third party service provider 404 may have shared the public key with the server 403 during the registration/enrollment process at step 502. In another example, the third party service provider 404 might not know how to validate the client certificate on its own, and may forward it to the server 403 (which may, e.g., validate the client certificate and send back validation information). In some instances, this data may be used for step up authentication (e.g., a process by which multiple forms of authentication are requested from the user to provide increased security) to the server endpoint or for other purposes. In some instances, the third party service provider 404 may be configured to validate the data using a private key, and the server 403 might not be configured to validate the TLS client certificate.

At step 519, after accessing and authenticating the token or client certificate at step 518, the third party service provider 404 may grant the client device 402 access to services provided by the third party service provider 404, respond to a query, or the like. For example, the third party service provider 404 may grant the client device 402 access based on authentication information identified by the third party service provider 404 and/or provided by the server 403.

Figure 6:
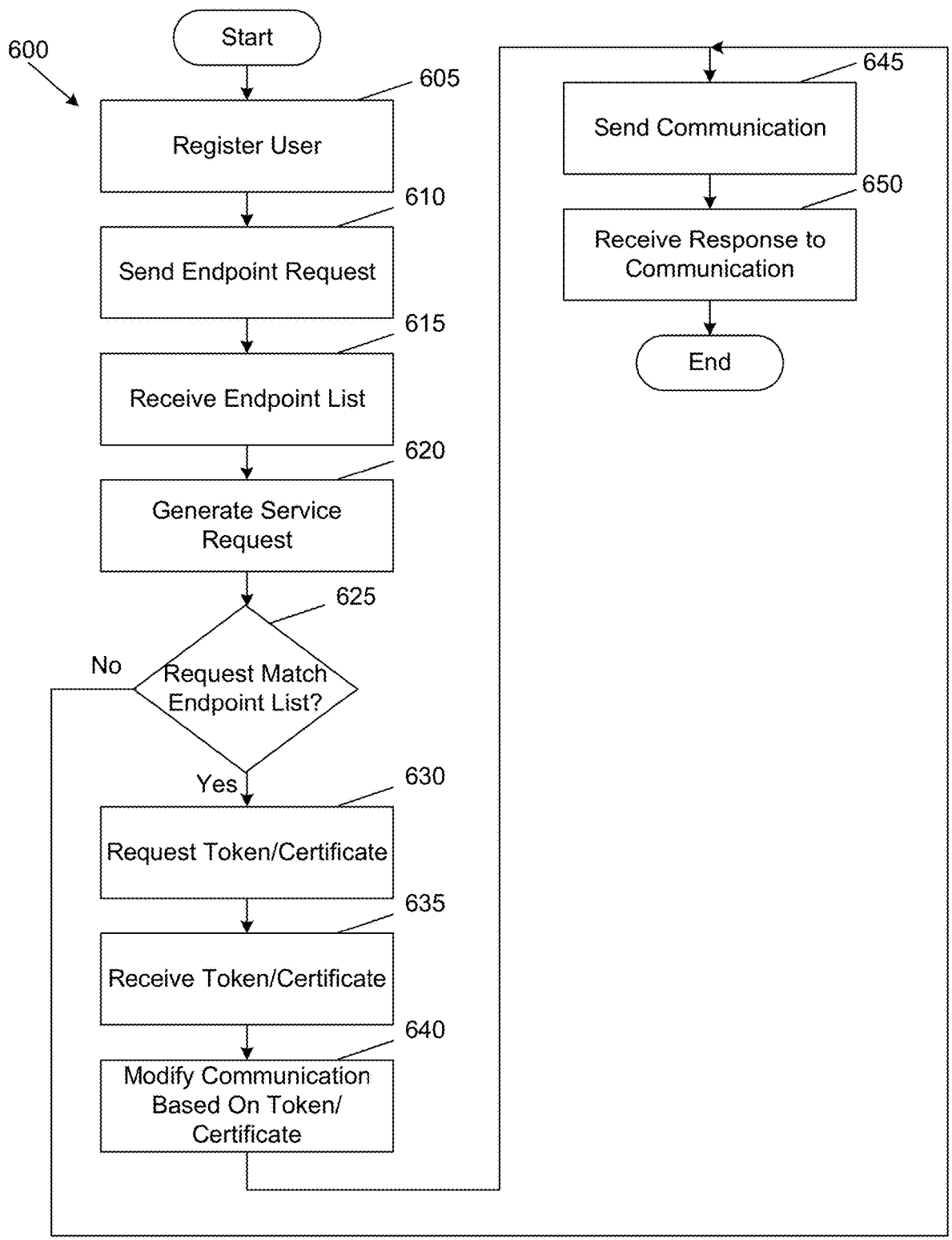
FIG. 6 depicts an illustrative method for injection of tokens or client certificates in managed application communication in accordance with one or more illustrative aspects described herein.

FIG. 6 depicts an illustrative method/algorithm 600 for performing injection of the token or client certificate for application communication in accordance with one or more illustrative aspects described herein. At step 605, a computing device comprising one or more processors, a communication interface, and memory may register a user or user device with a server. At step 610, the computing device may send a request to the server for a list of endpoints for which communications should be modified to include the token or client certificate. At step 615, the computing device may receive the list of endpoints. At step 620, the computing device may generate a communication. At step 625, the computing device may determine whether or not the communication corresponds to the list of endpoints for which communications should be modified. If the communication does not correspond to the list of endpoints for which communications should be modified, the computing device may proceed to step 645. If the communication does correspond to the list of endpoints for which communications should be modified, the computing device may proceed to step 630.

At step 630, the computing device may request credentials from the server. At step 635, the computing device may receive the token or client certificate from the server. At step 640, the computing device may modify the communication to include the token or client certificate. At step 645, the computing device may send the communication to a third party service provider. At step 650, the computing device may receive a response to the communication.

The following paragraphs (M1) through (M4) describe examples of methods that may be implemented in accordance with the present disclosure.

(M1) A method comprising intercepting a request from an application executable on the computing device, the request being to access a remote resource; modifying, future network communications between the computing device and the remote resource to include a token or a client certificate, wherein the token or the client certificate is an identifier that enables the future network communications to be routed to the remote resource for a given computing session without use of data from the remote resource or data indicative of a connection of the remote resource in which to receive the future network communications; and sending the future network communications to the remote resource to enable action to be taken on behalf of the computing device in response to receipt of the future network communications.

(M2) A method may be performed as described in paragraph (M1), wherein a server, corresponding to a first enterprise organization and configured to affect behavior of the application, is configured to generate the token based on an enrollment communication between the computing device and the server, wherein the token comprises one of: a set of randomly generated bits mapped, in a mapping table, by the server to an identity of the computing device or a hash of the identity of the computing device.

(M3) A method may be performed as described in any of paragraphs (M1) and (M2), the computing device is unable to parse the token, the server is unable to decrypt the token, and the server is configured to look up the identity of the computing device in the mapping table.

(M4) A method may be performed as described in any of paragraphs (M1) through (M3), wherein the token includes one or more of: a user identifier, an identifier of the computing device, time information, or endpoint information.

(M5) A method comprising: intercepting, by a computing device, a request from an application executable on the computing device, the request being to access a remote resource; modifying, by the computing device, the request to include credentials of a user of the computing device, the credentials being an identifier that enables the request to be routed to the remote resource for a given computing session without use of data from the remote resource or data indicative of a connection of the resource in which to receive the request; and providing, by the computing device, the request to the remote resource to enable action to be taken on behalf of the computing device in response to receipt of the request.

The following paragraphs (A1) through (A15) describe examples of apparatuses that may be implemented in accordance with the present disclosure.

(A1) An apparatus comprising at least one processor; and memory storying computer-readable instructions that, when executed by the at least one processor, cause the computing device to: intercept a request from an application executable on the computing device, the request being to access a remote resource; modify future network communications between the computing device and the remote resource to include a token or a client certificate, wherein the token or the client certificate is an identifier that enables the future network communications to be routed to the remote resource for a given computing session without use of data from the remote resource or data indicative of a connection of the remote resource in which to receive the future network communications; and send the future network communications to the remote resource to enable action to be taken on behalf of the computing device in response to receipt of the future network communications.

(A2) The apparatus according to paragraph (A1), wherein a server, corresponding to a first enterprise organization and configured to affect behavior of the application, is configured to generate the token based on an enrollment communication between the computing device and the server, wherein the token comprises one of: a set of randomly generated bits mapped, in a mapping table, by the server to an identity of the computing device or a hash of the identity of the computing device.

(A3) The apparatus according to paragraph (A2), the computing device is unable to parse the token, the server is unable to decrypt the token, and the server is configured to look up the identity of the computing device in the mapping table. (A4) The apparatus according to any one of paragraphs (A1) through (A3), wherein the token includes one or more of: a user identifier, an identifier of the computing device, time information, or endpoint information.

(A5) The apparatus according to any one of paragraphs (A1) through (A4), wherein modifying the future network communications to include the token comprises modifying the future network communications to include the token as an additional HTTP header.

(A6) The apparatus according to any one of paragraphs (A1) through (A5), wherein the token enables one or more of: single sign-on authentication or multi-factor authentication between the computing device and the remote resource.

(A7) The apparatus according to any one of paragraphs (A1) through (A6), wherein the token enables the remote resource to identify one or more of: a physical location or other endpoint information of the computing device.

(A8) The apparatus according to any one of paragraphs (A2) through (A7), wherein the apparatus is further configured to: send a request to the server requesting a list of server endpoints for which communication should be modified; and receive, from the server, the list of server endpoints for which communication should be modified, wherein the list of server endpoints for which communication should be modified includes the remote resource.

(A9) The apparatus according to any one of paragraphs (A2) through (A8), wherein the remote resource is affiliated with a second enterprise organization, different than the first enterprise organization.

(A10) The apparatus according to any one of paragraphs (A2) through (A9), wherein the apparatus is further configured to request, using a local framework, in response to launching the application, and from the MAM server, the token or the client certificate, wherein the local framework is deployed by the server and used to affect the behavior of the application, and receive the token or the client certificate from the server.

(A11) The apparatus according to any one of paragraphs (A1) through (A10), data comprises a cookie and wherein the connection comprises one or more of an internet protocol (IP) address for the remote resource or a secure sockets layer (SSL) session identifier for the remote resource.

(A12) The apparatus according to any one of paragraphs (A1) through (A11), wherein the future network communications are directed to the remote resource via a load balancer, wherein the load balancer may route the future network communications to the remote resource based on the token.

(A13) The apparatus according to any one of paragraphs (A2) through (A12), wherein the client certificate includes one or more of: a user identifier or a device identifier, and wherein the client certificate is generated by the server based on an enrollment communication between the computing device and the server.

(A14) The apparatus according to any one of paragraphs (A2)-(A12), wherein the MAM server is configured with a root certificate, the root certificate enables the server to generate the client certificate—and the remote resource is configured with a public key for the root certificate that enables the remote resource to validate the client certificate.

(A15) The apparatus according to any one of paragraphs (A1) or (A14), wherein modifying the future network communications to include the client certificate comprises modifying the future network communications to include the client certificate during a handshake between the computing device and the remote resource.

The following paragraph (CRM1) describes an example computer-readable media that may be implemented in accordance with the present disclosure.

(CRM1) A non-transitory computer-readable medium storing instructions that, when executed, cause a system to intercept a request from an application executable on the computing device, the request being to access a remote resource; modify future network communications between the computing device and the remote resource to include a token or a client certificate, wherein the token or the client certificate is an identifier that enables the future network communications to be routed to the remote resource for a given computing session without use of data from the remote resource or data indicative of a connection of the remote resource in which to receive the future network communications; and send the future network communications to the remote resource to enable action to be taken on behalf of the computing device in response to receipt of the future network communications.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A computing device, comprising:
at least one processor;
memory storying computer-readable instructions that, when executed by the at least one processor, cause the computing device to:
intercept a request from an application executable on the computing device, the request being to access a remote resource;
modify future network communications between the computing device and the remote resource to include a token or a client certificate, wherein the token or the client certificate is an identifier that enables the future network communications to be routed to the remote resource for a given computing session without use of data from the remote resource or data indicative of a connection of the remote resource in which to receive the future network communications;
send the future network communications to a load balancer, wherein the load balancer is configured to maintain stored correlations between either the token or the client certificate, and the remote resource;
identify, using the stored correlations maintained by the load balancer, the remote resource; and send the future network communications to the remote resource identified by the stored correlations to enable action to be taken on behalf of the computing device in response to receipt of the future network communications, wherein the computing device switches between network access points, internet protocols corresponding to the computing device change, and, using the stored correlations, the computing device maintains session stickiness with the remote resource.

2. The computing device of claim 1, wherein the computing device sends an enrollment communication to a server, the server corresponding to a first enterprise organization and configured to affect behavior of the application, wherein the server is configured to generate the token based on the enrollment communication, and wherein the token comprises one of: a set of randomly generated bits mapped, in a mapping table, by the server to an identity of the computing device or a hash of the identity of the computing device.

3. The computing device of claim 2, wherein the computing device is unable to parse the token, the server is unable to decrypt the token, and the server is configured to look up the identity of the computing device in the mapping table.

4. The computing device of claim 2, wherein the memory stores additional computer-readable instructions that, when executed by the at least one processor, further cause the computing device to:
send a request to the server requesting a list of server endpoints for which communication should be modified; and
receive, from the server, the list of server endpoints for which communication should be modified, wherein the list of server endpoints for which communication should be modified includes the remote resource.

5. The computing device of claim 2, wherein the remote resource is affiliated with a second enterprise organization, different than the first enterprise organization.

6. The computing device of claim 2, wherein the memory stores additional computer-readable instructions that, when executed by the at least one processor, further cause the computing device to:

request, using a local framework, in response to launching the application, and from the server, the token or the client certificate, wherein the local framework is deployed by the server and used to affect the behavior of the application, and receive the token or the client certificate from the server.

7. The computing device of claim 2, wherein the client certificate includes one or more of: a user identifier or a device identifier, and wherein the client certificate is generated by the server based on the enrollment communication between the computing device and the server.

8. The computing device of claim 2, wherein:

the server is configured with a root certificate, the root certificate enables the server to generate the client certificate, the remote resource is configured with a public key for the root certificate that enables the remote resource to validate the client certificate.

9. The computing device of claim 1, wherein the token includes one or more of: a user identifier, an identifier of the computing device, time information, or endpoint information.

10. The computing device of claim 1, wherein modifying the future network communications to include the token comprises modifying the future network communications to include the token as an additional HTTP header.

11. The computing device of claim 1, wherein the token enables one or more of: single sign-on authentication or multi-factor authentication between the computing device and the remote resource.

12. The computing device of claim 1, wherein the token enables the remote resource to identify one or more of: a physical location or other endpoint information of the computing device.

13. The computing device of claim 1, wherein the data comprises a cookie and wherein the connection comprises one or more of an internet protocol (IP) address for the remote resource or a secure sockets layer (SSL) session identifier for the remote resource.

14. The computing device of claim 1, wherein modifying the future network communications to include the client certificate comprises modifying the future network communications to include the client certificate during a handshake between the computing device and the remote resource.

15. A method comprising:

at a computing device comprising at least one processor, a communication interface, and a memory:

intercepting a request from an application executable on the computing device, the request being to access a remote resource;

modifying future network communications between the computing device and the remote resource to include a token or a client certificate, wherein the token or the client certificate is an identifier that enables the future network communications to be routed to the remote resource for a given computing session without use of data from the remote resource or data indicative of a connection of the remote resource in which to receive the future network communications;

sending the future network communications to a load balancer, wherein the load balancer is configured to maintain stored correlations between either the token or the client certificate, and the remote resource;

identifying, using the stored correlations maintained by the load balancer, the remote resource; and sending the future network communications to the remote resource identified by the stored correlations to enable action to be taken on behalf of the computing device in response to receipt of the future network communications, wherein the computing device switches between network access points, internet protocols corresponding to the computing device change, and, using the stored correlations, the computing device maintains session stickiness with the remote resource.

16. The method of claim 15, further comprising configuring a server to generate the token based on an enrollment communication between the computing device and the server, the server corresponding to a first enterprise organization and configured to affect behavior of the application, and wherein the token comprises one of: a set of randomly generated bits mapped, in a mapping table, by the server to an identity of the computing device or a hash of the identity of the computing device.

17. The method of claim 16, further comprising configuring the server to look up the identity of the computing device in the mapping table and wherein the computing device is unable to parse the token and the server is unable to decrypt the token.

18. The method of claim 15, wherein the token includes one or more of: a user identifier, an identifier of the computing device, time information, or endpoint information.

19. A method comprising:

intercepting, by a computing device, a request from an application executable on the computing device, the request being to access a remote resource;

modifying, by the computing device, the request to include credentials of a user of the computing device, the credentials being an identifier that enables the request to be routed to the remote resource for a given computing session without use of data from the remote resource or data indicative of a connection of the remote resource in which to receive the request;

sending the request to a load balancer, wherein the load balancer is configured to maintain stored correlations between the credentials and the remote resource;

identifying, using the stored correlations maintained by the load balancer, the remote resource; and providing, by the computing device, the request to the remote resource identified by the stored correlations to enable action to be taken on behalf of the computing device in response to receipt of the request, wherein the computing device switches between network access points, internet protocols corresponding to the computing device change, and, using the stored correlations, the computing device maintains session stickiness with the remote resource.

* * * * *